United States Patent [19]

Sansone et al.

[11] Patent Number: 5,077,694

[45] Date of Patent: Dec. 31, 1991

[54] DISTRIBUTION MAILING SYSTEM HAVING A CONTROL DATABASE FOR STORING MAIL HANDLING CATEGORIES COMMON TO THE DATABASES OF SELECTED MAILER STATIONS

[75] Inventors: Ronald P. Sansone, Weston; Joseph W. Wall, Monroe, both of Conn.

[73] Assignee: Pitney Bowes Inc., Stamford, Conn.

[21] Appl. No.: 285,486

[22] Filed: Dec. 16, 1988

[51] Int. Cl.[5] ............................................ G06F 15/20

[52] U.S. Cl. .................................... 395/600; 364/940; 364/940.61; 364/940.68; 364/963; 364/963.5; 364/974; 364/974.1; 364/974.2; 364/974.7; 364/260; 364/282.1; 364/282.4; 364/284.4; 364/464.02; 364/464.03; 364/DIG. 1; 364/DIG. 2

[58] Field of Search ...................... 364/464.02, 464.03, 364/466, 200, 900

[56] References Cited

U.S. PATENT DOCUMENTS

| | | | |
|---|---|---|---|
| 4,097,923 | 6/1978 | Eckert, Jr. et al. | 364/900 |
| 4,410,961 | 10/1983 | Dlugos et al. | 364/900 |
| 4,410,962 | 10/1983 | Daniels et al. | 364/900 |
| 4,466,079 | 8/1984 | Daniels et al. | 364/900 |
| 4,713,761 | 12/1987 | Bryson et al. | 364/406 |
| 4,837,701 | 6/1989 | Sansone et al. | 364/464.03 |
| 4,907,161 | 3/1990 | Sansone et al. | 364/464.02 |
| 4,908,770 | 3/1990 | Breault et al. | 364/464.02 |
| 4,941,091 | 7/1990 | Breault et al. | 364/406 |

*Primary Examiner*—Thomas C. Lee
*Assistant Examiner*—Krisna Lim

[57] ABSTRACT

A communication system for processing information for distribution, including: a central data station, a plurality of user stations, a communication link interconnecting the central station with each of the user data stations, the central station including having capability, for periodically and cyclically accessing each of selected ones of the user stations, means for accessing the data base at each of the accessed user stations, and for dividing the data base into a plurality of categories, a data base storage area for storing each of the categories the central data station has capability for augmenting each of the categories from each accessed user data base for accessing each of the categories in accordance with an authorized user station request, and for transmitting the accessed category to the requesting user.

8 Claims, 5 Drawing Sheets

DISTRIBUTION MAILING SYSTEM HAVING A CONTROL DATABASE FOR STORING MAIL HANDLING CATEGORIES COMMON TO THE DATABASES OF SELECTED MAILER STATIONS

BACKGROUND OF THE INVENTION

This invention relates to mail processing, and specifically to improvements in mail processing systems, which will relieve central postage facilities of certain mail handling tasks.

The United States currently has the world's largest postal system. The U.S. Post Offices currently handle in excess of 100 billion pieces of mail per year, about half the total volume handled throughout the world. The servicing of mail delivery involves three essential steps; collection, sorting and delivery. Collection takes place through a series of post offices spread throughout the United States. The United States has about 30,000 post offices that provide mail services in addition to 9,000 smaller postal centers which provide some kind of some type of mail service. Postal employees typically take letters and packages from mail box facilities to the nearest local office where they are accumulated for the sorting procedure. At the post office, postal clerks remove collected mail from sacks, bundle packages and segregate mail by size and class into separate categories. The mail travels by truck from local post offices to a central facility known as a sectional center. The United States has 264 sectional centers, some of which serve hundreds of local post offices. The sectional center processes nearly all the mail coming or going from its region. At the sectional center, high speed automated equipment sorts large volumes of mail The postal service currently uses two sorting systems One system is devoted to letters and other first class mail, and the other system, for bulk mailing, is used to sort packages, magazine advertising, circulars and other large mails. The letter sorter process involves manually moving mail sacks onto moving conveyor belts, which carry the mail to a machine called an edger-feeder which sorts it according to envelope size. The postal service regulates the size of envelopes to make such mechanical sorting easier. The edger-feeder feeds the letters into another machine known as a facer-cancellor. Sensing devices of the facer-cancellor determine where the stamp is located on the envelope, plus enabling the machine to arrange the letters so that they all face in the same direction. The canceling portion of the mechanism then cancels the stamp by printing black lines and the like over it so that it cannot be used again. The machine also prints a postmark on the envelope, including the date, the name of the sectional center, an abbreviation for the state and a three, four or five-number zip code. In addition, the postmark records the time period during which the letter was received at the post office. A computerized machine known as a zip mail translator sorts the postmarked letters according to the their destination post office. Postal workers selectively activate the machine's keyboard to send each letter on a conveyor belt into one of hundreds of bins. Each bin holds mail for a different post office. Mail addressed to locations outside the regions served by the sectional center are transported by truck, airplane or train to other sectional centers for further sorting. Finally, postal clerks hand sort mail for the area served by the sectional center into bundles for each delivery route. The zip mail translators in some postal areas have been replaced by more advanced computerized machines called optical character readers which read the zip code on the letter, and pass the mail to another machine that places a series of marks known as bar codes onto the envelope. Additional mechanisms read the bar code and sort mail according to the regions indicated by said bar code. Mail addressed to locations within the regions served by the section center is sorted again by other bar code readers according to destination post office and then according to delivery route. An expanded nine-number zip code, chiefly for use by high-volume mailers, enables the post office to substantially reduce some of these essential time consuming and extensive sorting services. The same processes apply to sorting bulk mail. Current estimates indicate that the foregoing processing tasks necessarily involve in excess of half a million employees. Cost of maintaining and supporting sorting services at the central post office facilities, even including large scale use of automated equipment, has become staggering. Projections of substantial increases in volumes of mail being transporting through central facilities, even with the advent of private delivery, telecommunications services, facsimile services and the like indicate a rapid expansion will be required of such facilities. Since the postal service is a private corporation and is expected to become self-supporting, rapidly advancing postal rates place greater and greater burdens on both users and the postal service in order to support such volumes of mail. In recognition of capabilities of certain high volume users to provide services to central postal facilities, which services may improve efficiency and reduce the amount of processing time required by the central serving facilities, the U.S. Postal Service offers substantial reductions in rates, provided that a user complies with certain requirements which will allow the U.S. Postal Service to take advantage of certain user-provided facilities to reduce its own work load. The concept of work sharing, wherein a user provides certain of the processing activities prior to delivering the mail to the central postal facilities has been proposed and is therefore a positive innovation in the field of mail processing which may have a substantial impact in the future implementation of mail services.

However, placing a burden on the user to provide certain of the facilities and services which the U.S. central post office facilities now provide is an equally heavy burden for the user, and must be done in a manner which permits the user to realize substantial savings with its own increased work load by taking advantage of the reduced postal service rates while not exceeding the reduction in rates by the serving costs of providing such services on its own.

The Postal Service has already recognized the ability of users to preprocess certain kinds of mail and will accept mail in bulk delivered from a processor along with certification that its procedures have been complied with, and will accept such certification as prima facia justification for reduction in postal service rates. Thus, for example, manifest systems, wherein a manifest is provided to the central post office representative of a group of documents preprocessed by the user, are already known and do allow the user to realize a substantial reduction in rate. However, a large number of additional services, aside from manifesting services, may also be provided by the user and accepted as such by the central processing facility of the postal service in exchange for rate reductions. These additional services, however, require interface communications between the central service and the user so as to maintain within the user's facility information regarding internal postal procedures, such as rates, volume, quantity discounts and the like in order for the central post office facility to accept as valid a certification by the user that certain procedures mandated by the Postal Service have been complied with. The automation of such processing, through the use of telephone or other data communication links, is essential to the successful operation of such a system.

It is therefore the principal object of the present invention to provide a system and apparatus within a user facility which will both operate and maintain, in current fashion, certain facilities which can be certified and accepted as properly performed via such certification by the central processing facilities of the U.S. Postal Service in order to qualify for substantial reductions in rate by the use of bidirectional communication links, and in so doing to utilize the communication link to augment and update data base facilities at the user and base stations so that facilitation of user limited facilities may be expanded beyond the user capacity by interaction with the larger central station.

BRIEF DESCRIPTION OF THE PRIOR ART

Prior systems relating to work share features are discussed in U.S. Pat. No. 5,019,991 issued May 28, 1991, U.S. Pat. No. 5,005,124 issued Apr. 2, 1991 and U.S. Pat. No. 4,713,761, issued Dec. 15, 1987 also assigned to the assignee of the present invention. The applications relates to the concept of using certain limited user provided services but do not encompass the full range of work sharing and data sharing services concepts presented herein. The U.S. patent relates to accounting and billing and does not solve the problem of relieving the postal service of substantial service burdens in an effective manner.

BRIEF DESCRIPTION OF THE INVENTION

The present invention relates to a method and apparatus for work sharing including information sharing between participants as well as self-contained automated processing facilities relative to specific requirements set forth by the postal service along with certification of compliance with such requirements acceptable to the Postal Service.

Specific certification requirements include analysis by the user of mail composition, currently known as 3602 Information, in accordance with the specific form currently employed by the post office facilities for such information, such composition including weight, volume, classifications, carrier route information, zip code, appropriate bar code, designations, and rate. In addition, other services such as extended presort coding addressing, accuracy of presorts, classification of mailpiece type for machine readability, accuracy of weight and volume in accordance with predesignated discount rates set by the Postal Service in accordance with such factors, and ultimately payment and billing, are all facilities which may be incorporated within a user facility. Incorporation of such information within a user facility, coupled with intercommunication capability between such user facility and a central postal facility, gives certain additional advantages to both user and postal facility which are inherent in the nature of information processing. Thus, the user facility may keep track for accounting purposes of its mailing and other processing as well as funding and volume uses, while the Postal Service may employ intercommunication with many of these user units to forecast workloads, transportation requirements, the management of asset inventory, the creation of mailer profiles, and other information which may be employable to establish process controlling to better manage the U.S. Postal Service resources. In addition, by making certain requirements of the user equipment, the requirement of range of operation of the central service facility equipment may be substantially narrowed. Thus, common fonts may be provided through user equipment which will reduce the requirement of central service facilities to have multiple font capability in optical character recognition.

The maintenance of a two-way communication link between the central station and each of the user facilities permits the central station to keep a permanent record, available for inspection by the U.S. Postal Service, and which may be employed to confirm uses of any of the local users by cross-check, of each of the elements of data which will be considered essential to any specific user application. Thus, each of the user applications are also designed to apply postage; central accounting and data facilities may be employed to keep track of each user's postage requirements. This may also employ two-way charging and recharging of local postage meters from the central station, also under authority from the U.S. Postal Service, and as have been previously disclosed in prior art remote recharging systems currently in use. Thus, during the on-line periods, multiple quantities of data may be exchanged between the central station and the local user. Thus, the present invention also provides in one embodiment for the employment of a central station with multiple processing ability, capable of high speed data interchange between pluralities Of remote local units and itself, and possessing the further capability internally of correlating data culled from each of the remote users which ma be employed both for statistical purposes and for the purposes of moderating usage by each of the local users and for insuring compliance with the latest U.S. Postal Service rules, regulations and certification procedures for work sharing.

Mailing machine usage and other relevant information is uploaded to the data center and compared with mailing machine information from other users in similar categories. For example, information from all insurance companies is gathered through this technique and put into a single data base. Each user, without being provided information regarding the identity of other users in the data base, is given information as to where its mailing capability stands in relation to other members of the industry, or to the users of mailing machines in general. For example, where remittance mail is captured, the date between the send out of the original invoice and the return of the remittance mail can be tracked and suitable reports provided as to credit ratings and demographics. The cost per mail piece can be provided to give an indication to the user where the user stands in relation to others in availing themselves of zip code breaks, presort breaks, bundling discounts, etc.

Communication in contrast may also be by means of a code or other form with the relevant information transmitted in encrypted format. The information may be scanned and used to automatically set the postal equipment at the user site to proper settings, both for postage and for usage scheduling, without direct user intervention, thus enhancing security and efficiency.

DESCRIPTION OF THE DRAWINGS

The foregoing brief description and summary of the invention will become more apparent from the following more detailed description of the invention, accompanied by the attached figures, wherein.

DETAILED DESCRIPTION OF THE PREFERRED EMBODIMENTS

Figure 1:
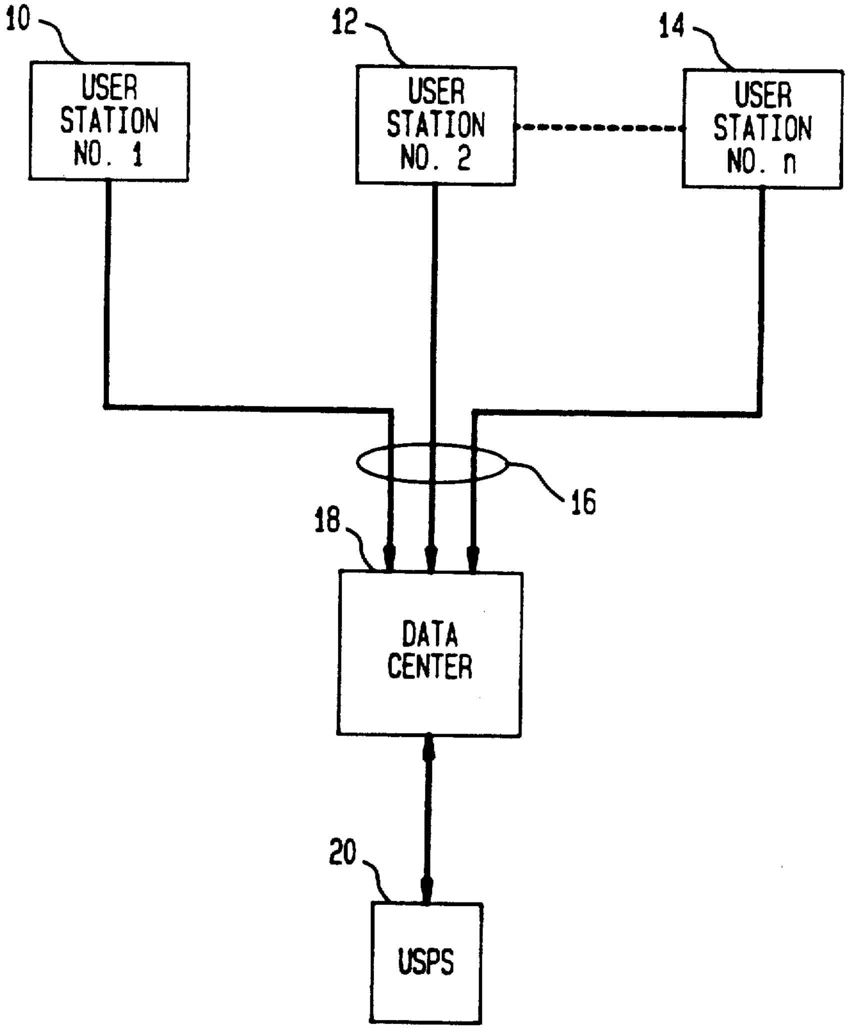
FIG. 1 is a functional block diagram illustrating the relationship between the data center, the U.S. Postal Service, and the local users.

With reference to FIG. 1, a plurality of user stations designated as $U_1, U_2 \ldots U_n$, and identified as 10, 14 and 16 are shown. It will be understood that multiple user stations are possible in excess of the three shown, and that these are shown by way of example only. These stations are coupled by means of an interconnection network, illustrated generally at 16, to the data center 18, which in turn may be appropriately coupled by means of a secure line or the like to the U.S. Postal Service 20. The data center is a facility run by a commercial operation, such as Pitney Bowes, Inc., the assignee of the present invention. Each of the blocks 10, 12, 14, 18 and 20 contemplate the use of data processing components, each appropriately interlinked by means of high speed telecommunication links or the like for the purposes of exchanging information. It is also contemplated within the scope of the invention that the U.S. Postal Service will maintain an appropriate computer facility, not otherwise described herein, which will possess the capability of uploading and downloading specific pieces of information upon request by the data center, and relating to appropriate postal rules and regulations which will affect the use of certain discounts in mailing postal rates, as well as other factors necessary for the concept of shared work services which will be certified by each of the individual user stations in order to qualify for reduced rate requirements when mail is received in the U.S. Postal Service facilities. The communication link is also contemplated as a two-way link between units 18 and 20, wherein the U.S. Postal Service will have the capability of monitoring specific operations within the data center in order to ensure that the data center is operational in accordance with rules and requirements which may be imposed by the Postal Service from time to time. The monitoring operation is a periodic unscheduled communication link examination of certain storage areas of accessed memory locations for confirming proper operations. Of course, visual on site inspections and examinations may also be made.

Figure 2:
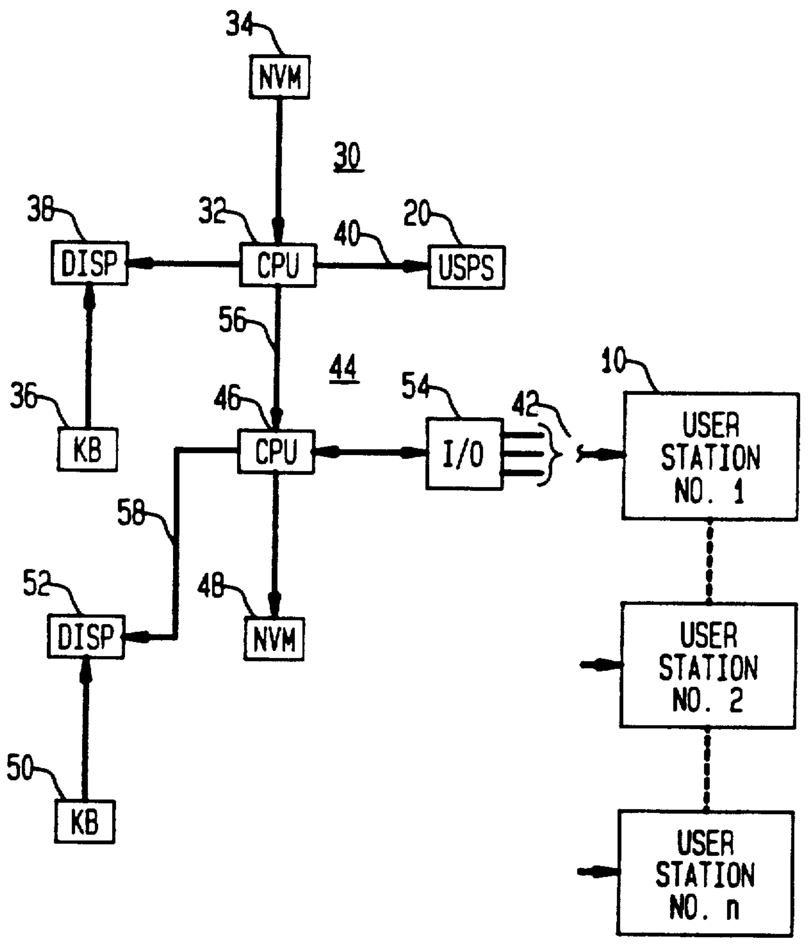
FIG. 2 is a more detailed block diagram illustrating a data center.

With reference to FIG. 2, a more detailed functional component relationship of the data center is illustrated. Thus, the data center includes a first data channel 30 which includes a Central Processing Unit (CPU) 32 having a program memory (NVM) 34, a keyboard 36 (KB) and an appropriate display (DIS) 38 coupled thereto. Data communication link 40 interconnects CPU 32 to the U.S. Postal Service 20. The user units 10 are coupled via appropriate telecommunication data links 42 to a second data channel 44 Which includes a CPU 46, a program memory 48, a keyboard 50 and an appropriate display 52. The CPU is coupled to the data links 42 by means of a multi-channel I/O device 54 capable of high speed data communication.

In operation, two-way communication between the data channel 30 and the Postal Service (USPS) 20 provides a continuous interchange of information regarding updates of U.S. Postal Service rules and regulations required for the continuous certification use by the local users 10. In addition, the data channel 30 may also be manually interrogated by means of keyboard 36 for inquiring of U.S. Postal Service for specific information which may be employed with regard to compliance with certifications, the answering of specific data questions, or other uses requiring specific interrogation by means of the central station to the U.S. Postal Service. Since the U.S. Postal Service (USPS) link is a two-way communication over channel line 40, it is possible through this link for the U.S. Postal Service to interrogate and monitor the operation of the first data channel 30 and the second data channel 44, for compliance with quality control and other security compliances which may be required by the U.S. Postal Service.

Turning now to the second data channel 44, high speed continuous two-way with respect to continuous update of U.S. Postal Service requirements for certification, servicing and diagnostics, training, and other information interchange, are affected by means of the CPU 46 operating through the high speed data channel 54 interfaced along with communication lines 42 to the multiple user network U1, U2 . . . Un. Operating under control of the program memory 48, the CPU 44 is contemplated as a high speed multiple processing information apparatus of conventional design such an IBM 3083 or a DCVAX unit which may handle multiple requests from any one or more of the users simultaneously through the multiple channel I/O device. Keyboard 50 and display 52 may be utilized for manual information interchange between any of the local users and the information operator. Although only a single keyboard display unit is illustrated, it will be understood that dataline 58 is a schematic representation of the existence of a multiple number of display keyboard combinations evidencing the use at the central station of a plurality of key operators available to answer user questions upon interrogation.

Figure 3:
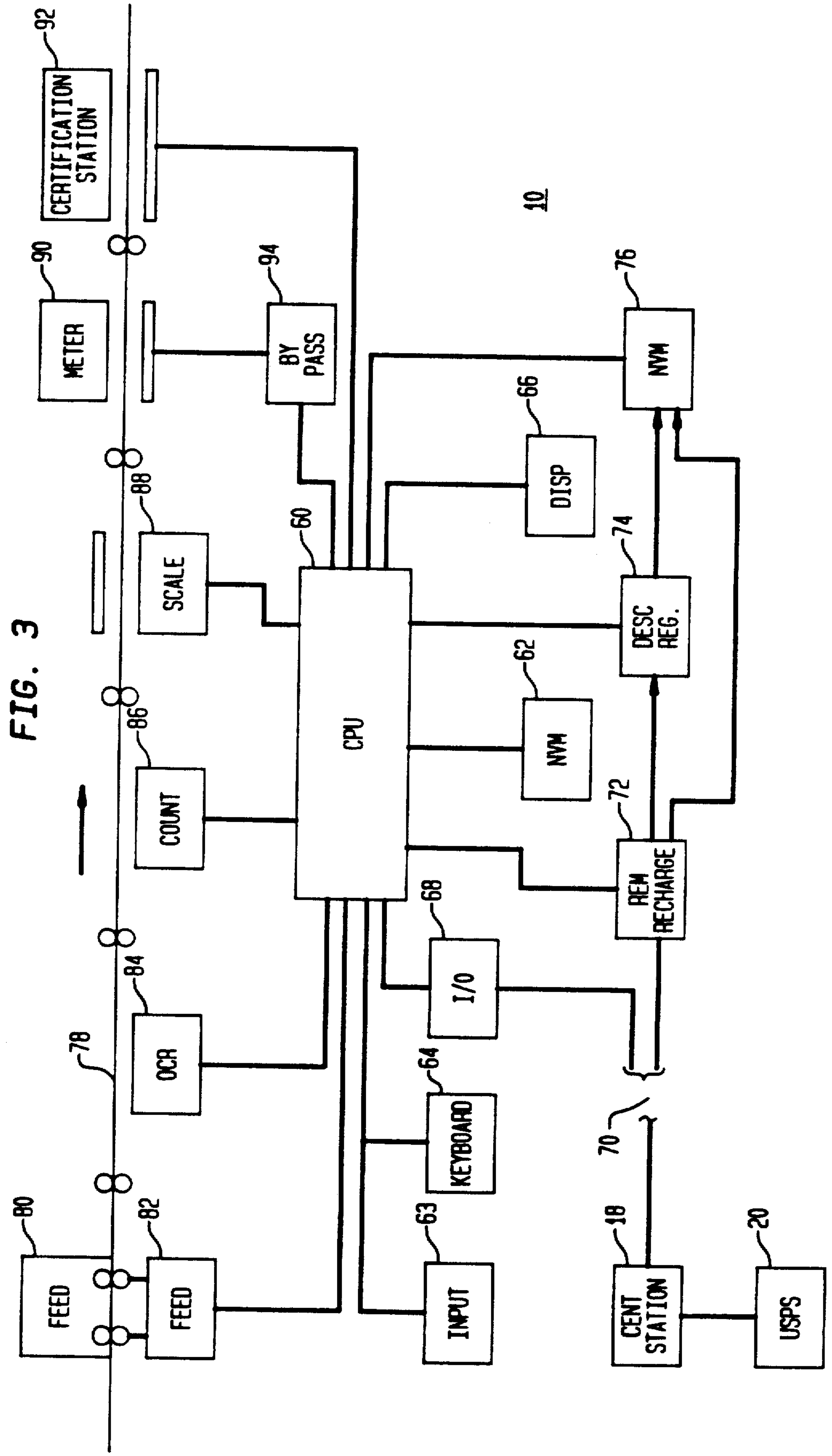
FIG. 3 is a more detailed block diagram illustrating a user station.

Referring to FIG. 3, the function block diagram illustrating the interrelationship of components within each individual user station is illustrated. The central user station operates under the control of a CPU 60, which includes a RAM memory and appropriate control registers. Coupled to the CPU 60 is a program memory 62 which defines the essential function of the system, including updating instructions and rates used in the local user units, diagnostic monitoring, a two-way communication link establishing a tracking facility utilizing the encryptic key represented by the certification, and interface capabilities with respect to the central station for the downloading of training information which enables operators at local stations to understand and comply with specific requirements imposed by the U.S. Postal Service with respect to the certification process. Coupled to the CPU 60 are a keyboard (KB) 64 for the manual entry of data requests and other information into the CPU, display unit 66 and an I/O channel 68 coupled by means of a data link 70 to the central station 18. Accounting information and funding to the local user 10 is affected through the data link 70 from the central station 18 to the remote recharger mechanism 72, operating in accordance with conventional recharging techniques, such is disclosed in U.S. Pat. No. 4,097,923, issued to Ecker et al. and assigned to the assignee of the present application. Remote recharging unit 72 charges a descending register 74, in conventional manner, which keeps track of descending balances charged from time to time in accordance with mail requirements. Non-volatile memory (MVM) unit 76 is employed to maintain security of information during of time when local user unit 10 is not operating. Non-volatile memory 76 receives descending register balances as part of a shutdown routine, along with other security data which may be applied from the active memory of the CPU 60. One of the features of the central unit 10 is that the remote recharging operation carried on in remote recharging circuit 72 is maintained through the data link 70 to the central station 18, and operates independently of the OFF/ON status of the local user unit 10 for monitoring purposes. Thus, even if the local unit 10 is turned off, central station 18 through data link 70 may inquire through the remote recharging unit of the status of certain pieces of information which are maintained either in the RAM memory portion of the CPU 60 during on-times of the unit 10 or in the non-volatile memory 76 during inactive status periods.

The concepts of work sharing entail the performance of certain postal service functions by the user in a secure manner so as to enable the user to apply not only postage but to also apply certification, as an imprint on the mail piece, which will be accepted by the postal service that the services certified were in fact performed by the user and thus enable the user to be entitled to further mail rate reductions. Communication in contrast may also be by means of a code or other form with the relevant information transmitted in encrypted format. The information may be scanned and used to automatically set the postal equipment at the user site to proper settings, both for postage and for usage scheduling, without direct user intervention, thus enhancing security and efficiency.

Certification information is provided to the CPU through a plurality of inputs along a mail path designated as 78. Mailpiece documents which are stacked in appropriate feeder-stacker unit 80 are, under control of CPU 60 through feeder-unit 82, driven along the mail path 78, past OCR an optical character recognition unit 84 where printed material on the mailpiece is read, past counter station 86 where individual pieces are counted, to the scale unit 88 where the mailpiece is weighed, and thence to a metering station 90 for application of appropriate postage and finally to a certification station 92 where appropriate certification stamps may be placed on the mailpiece to indicate compliance of the mailpiece with all the criteria that have been set under work sharing requirements required under the U.S. Postal Service regulations. Since the unit may be capable of handling prefranked mail, a meter bypass network 94 operating under control of the CPU, provides for bypassing of the mailpiece of the metering station 90 without the necessary application of additional postage. Problems encountered in short-weight mail may be adjusted by appropriate decrement of the descending register balance in descending register 74 under program control through CPU 60, based upon differences detected by the computer between applicable postage rate requirements and the actual mail run being passed through the user station 10. An example of short-weight mail is disclosed in U.S. Pat. No. 5,019,999 issued May 28, 1991.

As discussed previously, machine usage and other relevant information is uploaded to the data center and compared with mailing machine information from other users in similar categories. For example, information from all insurance companies is gathered through this technique and put into a single data base. Each user, without being provided information regarding the identity of other users in the data base, is given information as to where its mailing capability stands in relation to other members of the industry, or to the users of mailing machines in general. For example, where remittance mail is captured, the date between the send out of the original invoice and the return of the remittance mail can be tracked and suitable reports provided as to credit ratings and demographics. The cost per mail piece can be provided to give an indication to the user where the user stands in relation to others in availing themselves of zip code breaks, presort breaks, bundling discounts, etc.

Figure 4A:
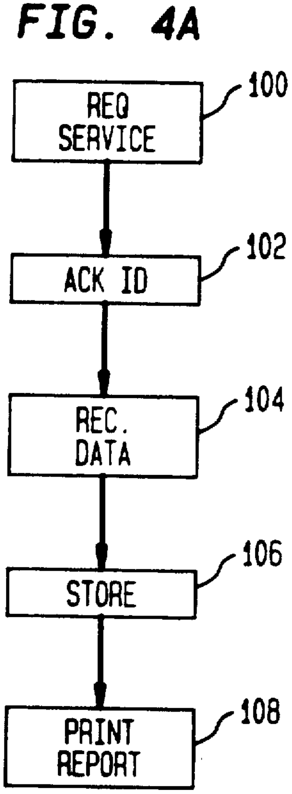
FIGS. 4a, 4b, 5a and 5b are flow charts illustrating the operation of FIGS. 2 and 3.
Figure 4B:
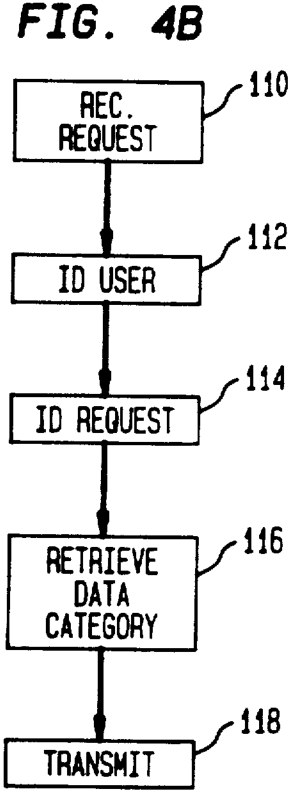
Figure 5A:
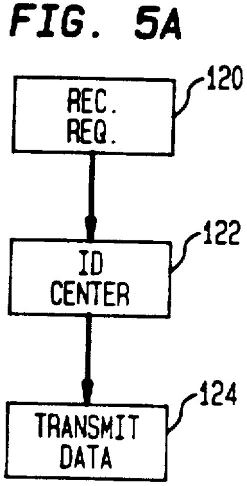
Figure 5B:
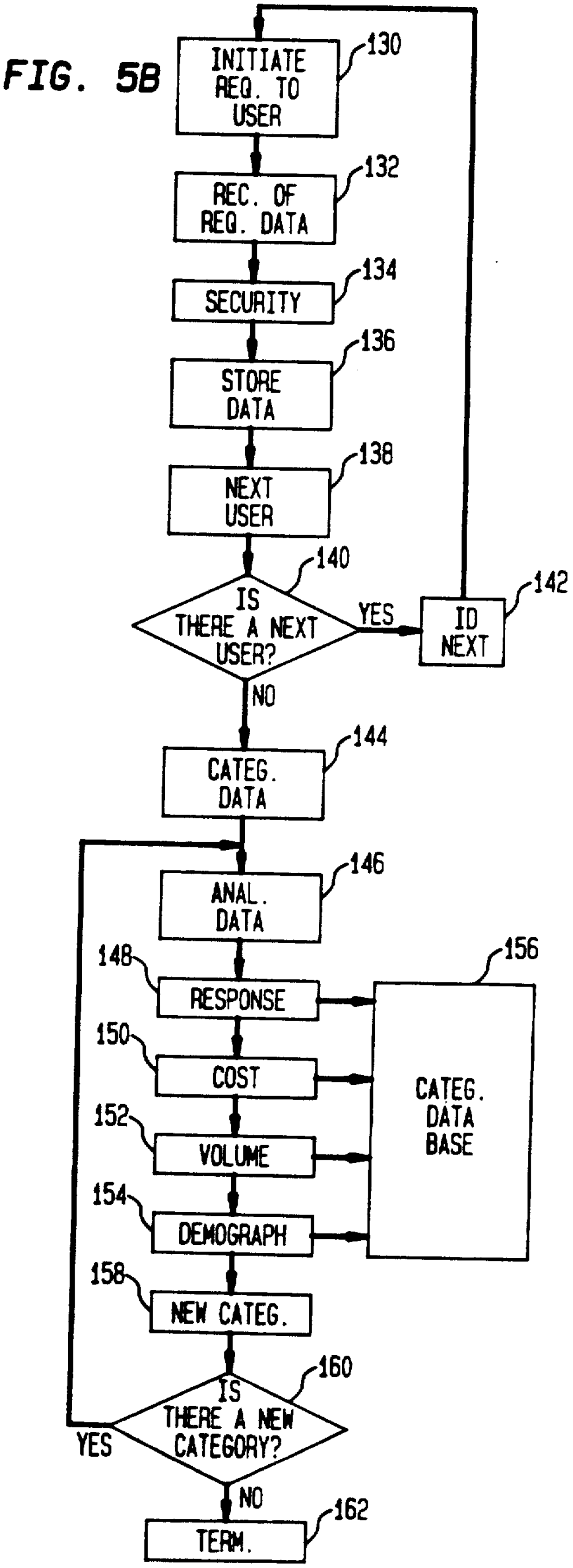

The usage data sharing concepts discussed above are implemented in accordance with a flow chart illustrated in conjunction with FIGS. 4*a* and 4*b*. FIG. 4*a* illustrates the operation of the user station whereas FIG. 4*b* illustrates the corresponding operation of the data center in conjunction of the operation of the flow chart of FIG. 4*a*. Thus, referring to FIG. 4*a*, a user station initiates a request for service 100 over a transmission line. The service request will be accompanied by a suitable user identification number or of code which will be analyzed by the data center for authentication and acknowledgement forwarded back to the user station to initiate the procedure 102. A data center meanwhile has analyzed the specific requests made by the user station and in response thereto transmits the data from the data center to the user station 104, which is received in the user station. Data is then stored 106, and later may be printed in accordance with specific user requirements 108. As shown in FIG. 4*b*, the data center operates by receiving the request 110, identifying the request 114, processing the user 112 and the request in order to retrieve the data category requested by the user 116, and then transmits such category back to the user pursuant to the user requirements 118. The information transmitted by the data center to the user, as explained above, is based upon periodic surveys undertaken over the transmission lines to various user units. The function and operation of the accumulation of this data base is critical to the implementation of the information sharing aspect of the present invention. Thus, referring to FIGS. 5*a* and 5*b*, the operation of the user station and data center is illustrated for this process. During periods when the user station is not otherwise engaged, such as at night or off periods, a request for information is received from the data center 120. The user, after performing appropriate authentication techniques, identifies the data center 122, and in response to data center requests, transmits information on the data base 124 such as the categories described above, for implementation and use by the data center for categorization purposes. Referring to FIG. 5*b*, the data center first initiates requests to the user 130, and then receives and stores data from the user in response to its requests 134. Suitable security is applied to the data so that any later retrieval by a specific customer of categorization information will not result in any confidential information of the user being supplied to other users. Various security techniques for insuring that such data is maintained in confidence and not otherwise used by the data center or transmitted or accessible to others may be accomplished by any one of several known techniques. Preferably, the user simply identifies that aspect of the data which is personalized and which should not be made part of any data base transmitted to other customers who would otherwise be requesting information in the same categories. The information is then stored 136 and the data center then cycles to the next user to be accessed 138. If there is to be a next user, as indicated by the Y branch of the decision 140 block following the next user step, identification is retrieved 142 from the data center data base as to the identification of the next user, and then the cycle is repeated. If there is not to be a next user, then the data base is analyzed internally within the data center. This internal analysis involves principally categorization 144. Thus, a typical analysis 146 for categorization purposes would, in a mail response system, include any system measuring the response of direct mail advertising 148, the category of the data, the response time, the cost 150, volume of mail 152, demographic analysis 154, and other aspects which would categorize data in this manner. Since several user data bases are employed, in the same category, for example in the insurance field, a very large data base 156 may be built up at the center of specific points of information or reference related to a specific category 158 of information which would be beyond the scope of a single user to obtain. A cycle can be repeated for each category by inquiring if a new category is present 160. If so the cycle is repeated until specific category data bases are expanded to a user usable level. If not, the routine is terminated 162.

In this manner, a large scale series of categorized data bases, accessible to pluralities of individual users on a request basis, may be made in a manner which employs existing equipment, serving purposes and functions relating to the accounting and metering and postage of high volume mail, in a work sharing environment, in order to provide additional services and functions not otherwise evident from the scope and purpose of the equipment.

The foregoing preferred embodiment may be varied within the spirit and scope of the invention, the expression of which is set forth in the appended claims.

What is claimed is:

1. A mailing system for processing information relevant to mail handling for distribution to mailers, comprising:

(A) a computerized central data station;

(B) a plurality of mailer stations each having a computer controllable database;

(C) a communication link interconnecting said computerized central data station with each of said mailer stations;

said computerized central data station including (a) means for accessing each of selected ones of said mailer stations;

(b) means for dividing said database at each of said accessed mailer stations into a plurality of mail handling categories common to the databases of the selected mailer stations;

(c) a database storage area at the computerized central data station for storing each of said mail handling categories;

(d) means for augmenting each of said mail handling categories with mail handling data received from each mailer station database;

(e) means for accessing each of said mail handling categories in accordance with a mailer station request;

(f) means for transmitting information from said accessed mail handling category as requested by a requesting mailer station to said requested mailer station in order for the requesting mailer station to handle its mail in more efficient and economical manner.

2. The system of claim 1, wherein said categories are based on operating information accumulated at each mailer station and unique to its business.

3. A central data station as claimed in claim 1, wherein the means for accessing includes means for polling said user stations via said communication link.

4. A central data station as claimed in claim 3, wherein said user data base includes confidential information, and said central data station includes means for preventing transmittal of confidential information to a requesting user.

5. A method of enhancing the efficiency and economy of individual mailers located at a separate mailer stations comprising the steps of:

(a) providing a computerized central data station with a database and providing at each of said mailer stations a computerized database;

(b) establishing a communication link interconnecting said central data station and each of said mailer stations and allowing said central data station to access each of a selected computerized database of said mailer stations;

(c) dividing said computerized databases into a plurality of mail handling data categories common to selected mailer stations;

(d) periodically polling selected ones of said mailer stations for accessing said computerized database at each of said accessed mailer stations;

(e) placing the accessed data from said computerized database into a respective common database storage area at said central data station for each of said mail handling data categories in order to augment each of said mail handling data categories with mail handling data from each of said accessed mailer database;

(f) upon a mailer request, accessing each of said augmented mail handling data categories in the storage area in accordance with said mailer's request; and (g) transmitting augmented mail handling data from said accessed mail handling data category to said requesting mailer, said augmented mail handling data containing information obtained from multiple mailers.

6. The method of claim 5, further including the step of securing segments of each user station data base to inhibit access thereof by other users.

7. The method of claim 5, further including the step of analyzing a data category of said central data base for deriving statistical data employable by the user for said category.

8. The method of claim 5, wherein said system is a postal delivery and certification system, and wherein each user station includes postal application, including the step of accounting for postage, storing said account in said data base, and including same in said communication of said data base to said central station.

* * * * *